L. Bailey,
Spoke Shave.

N° 55,599.  Patented June 19, 1866.

Witnesses:
Samuel N. Piper
Frederick Curtis

Inventor:
Leonard Bailey.
by his attorney.

UNITED STATES PATENT OFFICE.

LEONARD BAILEY, OF BOSTON, MASSACHUSETTS.

IMPROVEMENT IN SPOKESHAVES.

Specification forming part of Letters Patent No. 55,599, dated June 19, 1866.

*To all whom it may concern:*

Be it known that I, LEONARD BAILEY, of Boston, in the county of Suffolk and State of Massachusetts, have invented an Improved Spokeshave; and I do hereby declare the same to be fully described in the following specification, and represented in the accompanying drawings, of which—

Figure 1:
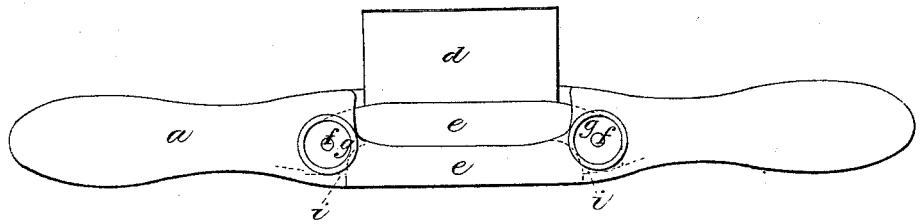
Figure 2:
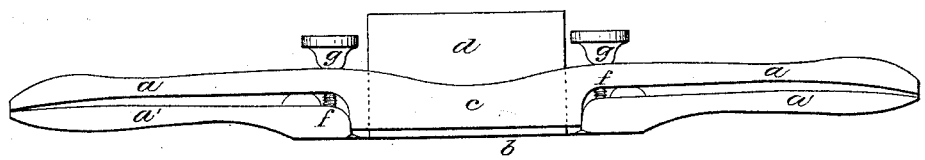
Figure 3:
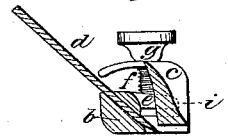
Figure 4:
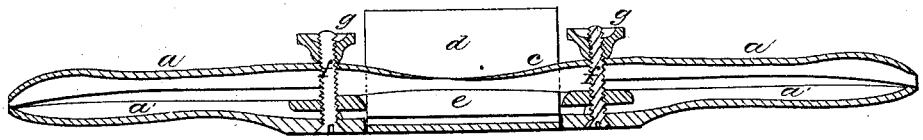

Figure 1 denotes a top view, Fig. 2 a front elevation, Fig. 3 a transverse section, and Fig. 4 a longitudinal section, of it.

In carrying out my invention I construct the stock of the spokeshave in two separate parts, and so that each of its handles shall be divided into two parts lengthwise, in manner as shown at $a\ a'$ in Figs. 1, 2, and 4. The two lowermost parts, $a'\ a'$, of the handles I combine in one piece with the cutter rest or supporter— that is, so as to extend in opposite directions therefrom—and I also combine the other two or upper parts, $a\ a$, of the handles with the adjustable shank-piece $c$, so as to be in one piece therewith and to extend in opposite directions from it, in manner as exhibited in the figures.

The cutter or shave-iron $d$, resting on the part $b$, I secure thereto by means of a clamp-bar, $e$, which is arranged on the cutter and directly over the part $b$, and is held in place (and so as to confine the cutter to the said part $b$) by means of two screws, $f\ f$, which go through the lower parts of the handles and screw through the said clamp-bar $e$, each of such screws being arranged at right angles, or thereabout, with the lower or bearing surface of the part $b$.

Furthermore, the clamp-bar is caused, near its ends, to abut against two shoulders, $i\ i$, formed in or on the stock. These shoulders are arranged in front of the clamp-bar, and not only serve to prevent the downward strain of the screws from breaking the said screws, but co-operate with the screws in setting the bar closely against the cutter or shave-iron, so as to confine it firmly to its bed.

The parts $a\ a$ touch the parts $a'\ a'$ simply at or near their extremities, the same being in order that such parts $a\ a$, with the extension portion $c$, may constitute a bow or curved spring, to raise the said portion relatively to the cutter, and so as to increase the throat of the implement.

The screws $f\ f$ are to extend through the parts $a\ a$ and screw into nuts $g\ g$, so applied to them as to act against the said parts $a\ a$, the said nuts and screws serving to effect a counter-movement of the part $c$, for the purpose of disconnecting the throat of the spokeshave.

The arrangement of the screws $f\ f$, the shoulders $i\ i$, and the clamp-bar $e$ relatively to the cutter or iron $d$, the bed on which it rests, and the bottom surface of the part $b$ renders the clamp very efficient in holding the cutter down to the bed, however the clamp, by the action of the screws, is driven downward in a direction which is at an obtuse angle, its surface in contact with the plane-iron. The screws $f\ f$, by their arrangement, perform the duty not only of holding the clamp down upon the plane-iron, but of co-operating with their nuts in springing the upper parts, $a\ a$, of the handle, so as to regulate the distance of the throat-piece $c$ from the plane-iron.

What I claim in the above improved spokeshave is as follows:

1. The combination of the screws $f\ f$ and nuts $g\ g$, or their equivalents, with the clamp-bar $e$, and with the stock divided lengthwise into two parts or portions, constructed substantially in manner and so as to operate as described.

2. The arrangement of the clamp-bar $e$ with the screws $f\ f$ and nuts $g\ g$, and with the stock divided lengthwise into two parts or portions, constructed substantially in manner and so as to operate with the said screws and nuts, substantially as set forth.

3. The combination and arrangement of the shoulders $i\ i$ with the screws $f\ f$, the clamp-bar $e$, the cutter $d$, and bed $b$, or the stock, substantially as set forth.

LEONARD BAILEY.

Witnesses:
R. H. EDDY,
FREDERICK CURTIS.